United States Patent [19]
Horner

[11] Patent Number: 5,284,048
[45] Date of Patent: Feb. 8, 1994

[54] LIQUID HYDROCARBON SKIMMER SYSTEMS AND METHODS OF MONITORING LEAKS IN HAZARDOUS LIQUID TANKS

[76] Inventor: John A. Horner, 2707 Inverness, Bay City, Mich. 48706

[21] Appl. No.: 938,297

[22] Filed: Aug. 28, 1992

Related U.S. Application Data

[63] Continuation-in-part of Ser. No. 749,919, Aug. 26, 1991, abandoned.

[51] Int. Cl.$^5$ ............................................. E02B 15/04
[52] U.S. Cl. ............................. 73/49.2; 73/863.23; 73/864.51; 73/864.72; 210/172; 210/242.4
[58] Field of Search ............... 73/49.2, 863.23, 863.21, 73/863.42, 864.51, 864.72; 210/776, 799, 172, 242.3, 242.4, 691, 500.21, 923, 242.1

[56] References Cited

U.S. PATENT DOCUMENTS

| | | | |
|---|---|---|---|
| 3,782,553 | 1/1974 | Biekke | 210/242.3 |
| 4,469,170 | 9/1984 | Farmer, Jr. | 210/242.3 |
| 4,663,037 | 5/1987 | Breslin | 210/242.1 |
| 4,872,994 | 10/1989 | Jakob | 210/242.4 |
| 4,998,585 | 3/1991 | Newcomer et al. | 210/242.3 |

Primary Examiner—Hezron E. Williams
Assistant Examiner—Michael Brock
Attorney, Agent, or Firm—Learman & McCulloch

[57] ABSTRACT

A floatable liquid hydrocarbon skimmer system for monitoring possible leaks in hazardous liquid tanks incorporates a vertically disposed tubular housing having an upper end with passages to admit liquid and provides a lower collection chamber for recovered hydrocarbon liquid. The housing has a hydrocarbon liquid-water separator associated with the chamber which has a capillarial filter which will pass only the hydrocarbon liquid through to the collection housing, while being impervious to the passage of water. A wick is in contact with the filter to draw the hydrocarbon liquid to the filter, and a valved outlet passage associated with the collection chamber permits emptying of the collected hydrocarbon liquid back to the tank.

23 Claims, 2 Drawing Sheets

LIQUID HYDROCARBON SKIMMER SYSTEMS AND METHODS OF MONITORING LEAKS IN HAZARDOUS LIQUID TANKS

BACKGROUND OF THE INVENTION

This invention is a continuation in part of my application Ser. No. 749,919 filed Aug. 26, 1991, now abandoned, and relates to automatic skimming and monitoring systems which are particularly adapted for monitoring underground fuel tanks at service stations.

State laws in many jurisdictions require that there be a periodic monitoring of such tanks in a manner to achieve a leak detection of as little as 0.05 gallons per hour and, of course, many operators, concerned with environmental considerations and eliminating potentially explosive conditions, are also desirous of removing hydrocarbon liquids which have leaked into the ground and may be contaminating ground water. The present invention is concerned with protecting tanks of the type disclosed in U.S. Pat. Nos. 4,571,987; 4,649,739; 4,739,648; and 4,885,931 which, of course, may contain diesel fuel oils and other hydrocarbon liquids, as well as gasoline. Monitoring wells are often used adjacent to such underground tank sites for the purpose of sampling the ground water from time to time to determine if there has been any leakage of the stored product. Such monitoring wells are frequently used, for example, when a secondary barrier is constructed around the site and its monitoring wells, which is sufficiently thick and impermeable with respect to the substance stored so that any releases from the tank are directed to one of the monitoring wells. Underground water monitoring regulations normally require that the regulated liquid be immiscible in water and have a specific gravity of less than one. Further, the ground water must never be more than twenty feet from the ground surface and the soils between the underground tank and monitoring wells must consist of gravels, coarse to medium sands, coarse silts, or other permeable materials. Such wells must allow the entry of regulated substances on the water table into the well under both high and low groundwater conditions.

SUMMARY OF THE INVENTION

The system of the present invention is constructed to continuously and automatically remove floating hydrocarbons from the ground water surface in a monitoring well without the necessity of employing expensive electronics, pumps, or valves, and incurring labor costs. The system need only be checked periodically to see whether hydrocarbons have filtered into the collection chamber. If the chamber needs emptying, it is a simple matter to removing the skimming system from the well and drain the hydrocarbon liquids back into the storage tank. The necessity of pumping a mixture of water and liquid hydrocarbons, and disposing of it at a remote site, is avoided with the present system. When used in monitor wells, the buoyancy of the skimmer system must be carefully controlled so that it floats with a predetermined portion of its upper end projecting a predetermined distance above the ground water level. The present skimmer system includes a vertically disposed tubular housing having an upper end provided with passages to admit hydrocarbon liquid floating on the surface of the water table. At its lower end, the system provides a lower collection chamber for recovered hydrocarbon liquid and, disposed between this collection chamber and the passages, is a filter separator which will pass only the hydrocarbon liquid to the collection chamber. The separator utilizes a filter element, and a wick associated with the filter element to draw the hydrocarbon liquid to the filter. It further provides for the removal of air from the collection chamber as the chamber fills.

One of the prime objects of the present invention is to provide a reliable, yet simple and inexpensive, system which accomplishes the dual function of monitoring the monitor well in which it is used, while at the same time receiving hydrocarbon liquids which may have leaked into the ground water and separating them from the ground water so that they can be simply drained back into the tank.

A further object of the invention is to provide a floating skimmer system for monitor wells which is so weighted that its upper end with the filter element floats on the water table liquid.

Still another object of the invention is to so support the skimming system, when a substantial volume of hydrocarbon liquids have been passed through to the collection chamber, that it does not sink and admit ground water to the collection chamber.

Another object of the invention is to provide a skimmer system which can be adapted to the particular monitoring well in the sense that its buoyancy can be altered when necessary.

Other objects and advantages of the invention will be pointed out specifically or will become apparent from the following description when it is considered in conjunction with the appended claims and the accompanying drawings.

GENERAL DESCRIPTION

Figure 1:
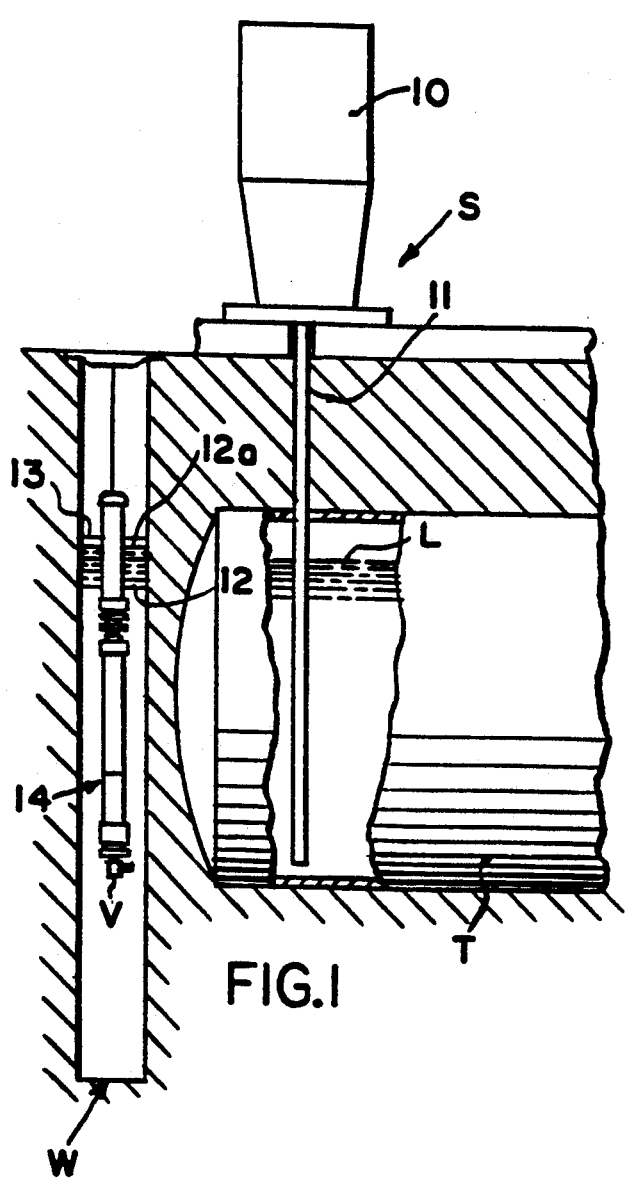
FIG. 1 is a fragmentary, schematic, partly sectional, elevational view of an underground storage tank and an adjacent monitoring well, the tank being shown greatly out of proportion for the sake of clarity of illustration.

Referring now more particularly to the accompanying drawings, a service station environment is indicated generally at S and is shown as having an above ground pumping station 10 with a pumping conduit 11 extending down into an underground tank T which contains a hydrocarbon liquid L such as gasoline. The tank T is much reduced in size in FIG. 1, relative to other elements. As in the aforementioned patents, the tank T has a fill pipe and a vapor vent pipe in the usual manner.

Provided adjacent to the tank T are one or more monitoring wells generally designated W, which are shown as having ground water 12 therein to a level 12a. For purposes of illustration in FIG. 2, a hydrocarbon film 13 is disclosed as floating on the ground water surface.

Figure 5:
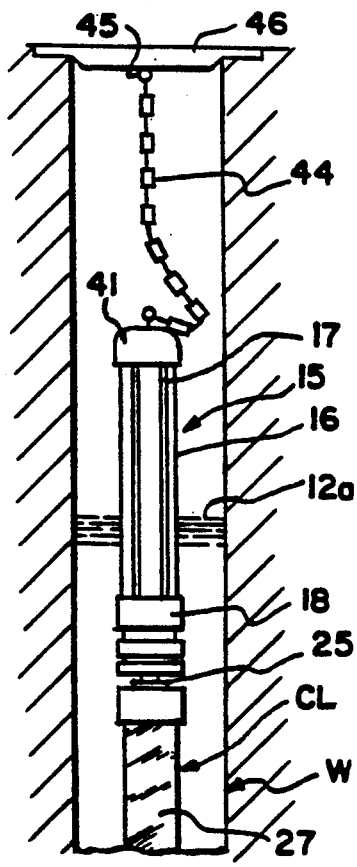
FIG. 5 is a fragmentary, sectional, elevational view, similar to FIG. 2, showing the manner in which the skimmer system is buoyantly supported when there is no liquid, or virtually no liquid, in the collection chamber.
Figure 6:
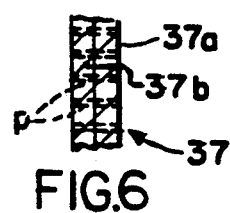
FIG. 6 is an enlarged fragmentary cross-sectional view through a typical filter element.

The automatic skimming and monitoring system of the present invention, which is generally designated 14, is shown as floating on the water table liquid in FIGS. 1 and 5. It includes an outer tubular housing, generally designated 15, which has sufficient buoyancy to float with its upper end projecting a predetermined distance above the water line 12a. As FIGS. 2 and 3 particularly indicate, outer housing 15 is an assembly comprising an upper cylindrical tube 16 having circumferentially spaced axially parallel vertical slots 17 providing passages which will admit liquid to the interior of tube 16. A fitting 18 receives the lower end of the tube 16 and is threaded at its lower end as at 19 so as to be received by an oppositely disposed fitting 20, having threads 21 which are threadedly engaged with the threaded surface 19. The lower reduced diameter end 20a of the fitting 20 is received by a collar 22 which has an opening 23 to pass the lower threaded end of reduced diameter 24a of an interior, filter cartridge support sleeve 24. The shoulder 24b of sleeve 24 is of sufficient diameter to overly the opening 23 so that the support 24 is retained by the member 22.

Figure 2:
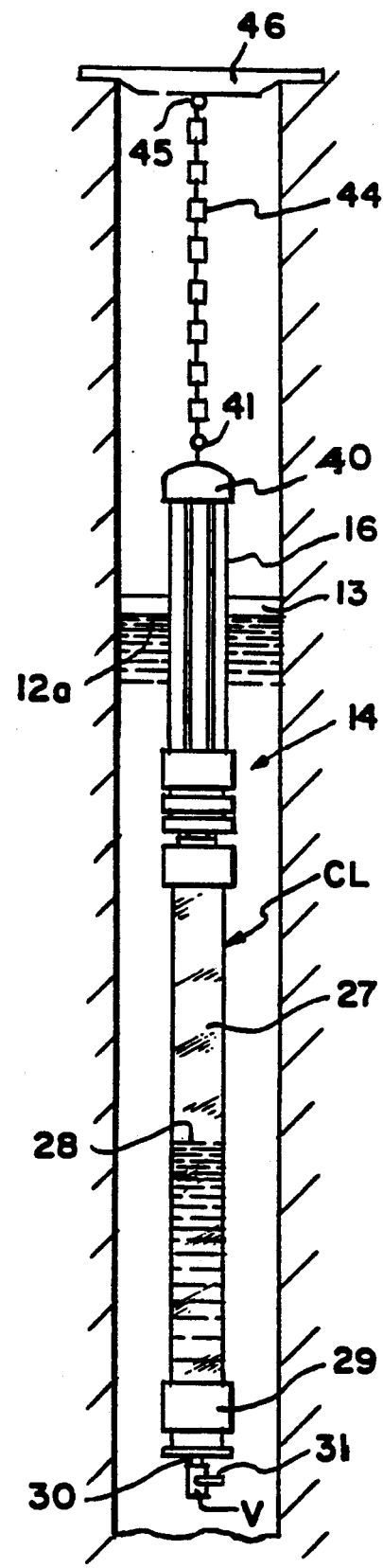
FIG. 2 is an enlarged, fragmentary, sectional elevational view showing the manner in which the skimmer system is supported within the monitoring well when the collection chamber has filled enough to empty.
Figure 4:
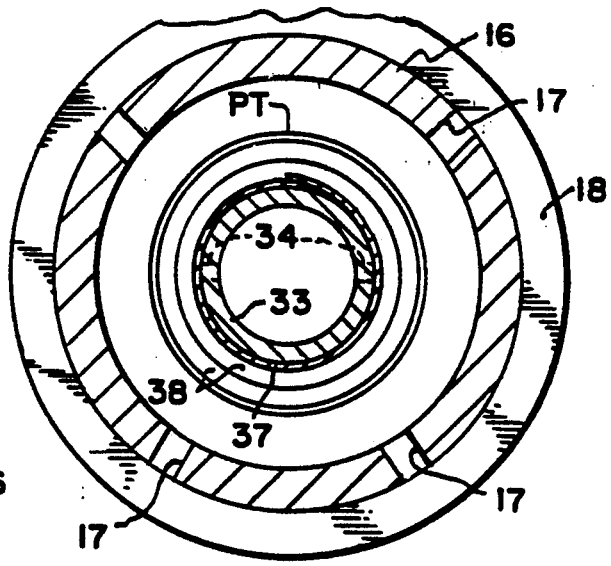
FIG. 4 is a considerably enlarged, sectional plan view taken on the line 4—4 of FIG. 3.

A threaded cylindrical support 25 has an upper end which is threaded as at 26 to interfit with the threaded lower end 24a of the support sleeve 24 and from which it suspends a lower collection chamber generally designated CL. The collection chamber CL which forms the lower end of housing assembly 15 comprises a transparent plastic cylindrical tube 27 which, as shown in FIG. 2, is about half full of collected hydrocarbon liquid 28. At its lower end, the tube 27 is received by a lower end fitting 29, and it should be understood that the lower end of the tube 27 is open to a tube 30 leading to a valve assembly generally designated V. Valve assembly V is a conventional valve and includes a lever 31 which may be manipulated, i.e., rotated, to either pass liquid through the valve assembly V from the tube 30 or to close off the tube 30.

Provided within the upper portion of the assembly 14 is a separator cartridge, generally designated SC, which is peripherally spaced from the internal wall of tube 16 and comprises a plastic tube 33 with its lower end received and sealed within the fitting 24. Any suitable waterproof adhesive may be utilized to effect the seal between the lower end of tube 33 and the internal wall of sleeve 24. Elongate axially parallel slots 34 are provided at circumferential intervals in the tube 33, and the upper end of the tube 33, above the vertical slots 34, is covered by a cup shaped cap member 35 having an opening 36 in communication with the open upper end of tube 33. The ca member 35 is similarly adhesively secured in position with an adhesive which also functions as an effective liquid seal.

Wrapped around tube 33 is a filter membrane element 37 having a thickness in the range 25-65 mm., and wrapped around filter 37 twice so that it has two thicknesses is an absorbent wick 38. Both the filter 37 and the wick 38 resist and prevent the passage of water, while admitting and passing the much lighter liquid hydrocarbon. Hydrocarbons with a specific gravity under one thus pass to the interior of tube 33 and on to tube 27. It will be noted that both the filter 37 and wick 38 are of such axial length as to cover the slots 34 provided in the tube 33. The overlapped edges of the membrane film 37 which has microscopic pores p are adhesively secured to one another and the ends of film 37 protrude beyond wick 38 and are held tightly against the tube 33 by rubber O-rings or the like 39. The wick 38 is a polypropylene paper toweling with each layer 3/16ths of an inch in thickness and can be ordered in roll form from Cleveland Cottonwood Products Corporation of Cleveland, Ohio. It has some openings of some magnitude between the fibers of its fibrous structure which are much larger than ten microns. This toweling is non-hygroscopic and tends to shed water without absorbing it. It does attract or wick the liquid hydrocarbon. The wick can be held in wrapped contact with the filter 37 by plastic ties PT or in any other suitable manner. The filter membrane 37 is an inert polytetrafluorethlyene film consisting of laminated polytetrafluorethlyene layers. The layers 37a and 37b may be solid with microscopic pores p or the radially inner one of them may be a screen serving as a backer for the other. Alternatively, the membrane 37 may be a layer of polytetraflourethylene with pores p sandwiched between and laminated to polypropylene inner and outer backer screen layers or to a single backer layer. The filter 37 is naturally hydrophobic and chemically stable in the presence of hydrocarbon liquid. The layers of the membrane 37 may have a pore size of 1 um (micron) and an air permeability of 1000 ml/min/in, and pass the hydrocarbon liquid through by capillary attraction. If the pores p are greater than ten microns some water gets through at the foot depth the membrane is typically floating, once toweling 38 becomes saturated with hydrocarbon and some moisture reaches the membrane 37. It has been found that pores of two and three microns diameter will work without admitting water at typical depth pressures and will maintain an adequate flow rate. If the pores o ar less than one micron the gasoline does not get through in a stable state. The membrane thickness may be in the range 6-7 millimeters.

Figure 3:
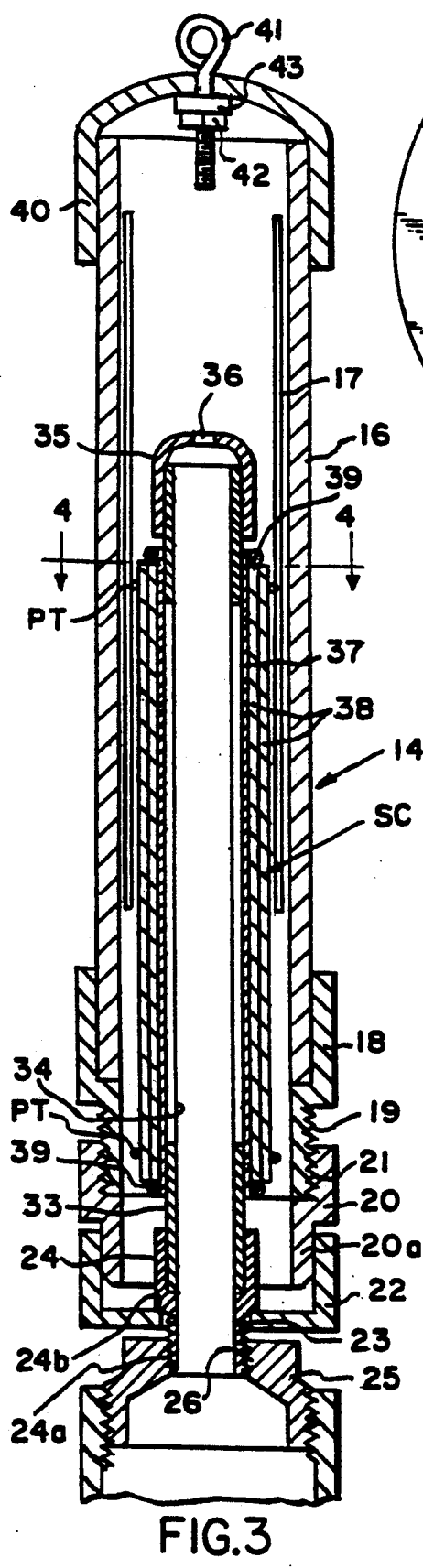
FIG. 3 is a greatly enlarged, fragmentary, sectional, elevational view of the upper end of the skimmer unit only, illustrating the construction of the separating cartridge particularly.

As FIG. 3 particularly indicates, the upper end of tube 16 is closed by a cup shaped cap generally designated 40. The cap 40 may be adhesively secured to the tube 16 and carry an attachment eye bolt 41 which has a nut 42 securing a lead washer 43 or the like which adds a predetermined weight to the device. As FIG. 5 indicates, a light weight, i.e. aluminum, chain 44 secures to the eye bolt 41 and at its upper end secures to an eye 45 provided on the lower end of a well cover member 46.

THE OPERATION

The skimmer is shown initially installed in FIG. 5 in a monitoring well which has a ground water level 12a with no discernible liquid hydrocarbon content. In this condition of the device, the buoyancy of the skimmer system is such that the chain 44 is slacked as at 44a and the collection tube 27 is empty. Assuming that hydrocarbon liquid enters the monitoring well, it will float on the surface of the ground water as indicated at 13 in FIG. 2. Both the ground water and hydrocarbon liquid are able to enter the interior of tube 16 through the slots 17, but the composition of the absorbent layers 38 is such that it is mainly only the hydrocarbon liquid which tends to be wicked to the filter 37 and distributed vertically over its length by wick 38. The filter 37 will capillarily pass only the hydrocarbon liquid through its pores to the interior of tube 33 through the slots 34. In this, it is aided by the pressure of the water surrounding the members 38 and 37.

FIG. 2 shows the skimmer system in a position in which the collection chamber 27 is virtually full of liquid and chain 44 has been extended due to the added weight of the stored hydrocarbon liquid in the chamber 27. Chain 44 is of such a length relative to the buoyancy of the skimmer system that it will not permit the skimmer system to sink beyond a predetermined level. For instance, if water were to enter the tube 33 via the opening 36, the separating function of the device would be lost. It would not then be possible to drain the hydrocarbon liquid separated back into the tank T, once the skimmer system was removed from the well W. This is accomplished by removing the skimmer system from the well W and suspending it over the opened fill pipe for tank T. Manipulation of the handle 31 of valve V through 90°, then, opens the valve to permit the liquid from chamber 27 to be restored to the tank T. Of course, only gasoline with substantially no water content may be returned.

Because the tube 27 is transparent, the level of separated hydrocarbon liquid 28 can be readily observed at any time. The presence of separated liquid hydrocarbon can be detected by visually inspecting the tube or cylinder 27. When empty, the system floats in water with about 6 inches of its filter element above the water line and the remaining lower cylinder assembly providing the buoyancy required. The lead washer 43 selected for a particular skimmer system counterbalances this buoyancy and provides a control which can be varied to suit conditions. When empty, the light chain 44 should have approximately 3 inches of slack and this absence of slack, of course, is, also, a detection indicator which can be instantly noted. As indicated, the cartridge filter and wick are capable of replacement when necessary. The filter 37 is protected from premature blinding by the use of the coarser filter overlay 38 which provides contact with the filter 37 above the liquid water level in the well W as well as below it. The migration of various fuels through members 38 and 37 is, of course, a function of their viscosity and gasoline will have a greater separation rate than fuel oil.

It is to be understood that the embodiments described are exemplary of various forms of the invention only and that the invention is defined in the appended claims which contemplate various modifications within the spirit and scope of the invention.

What is claimed is:

1. A liquid hydrocarbon skimmer system for monitoring possible leaks in hazardous liquid tanks comprising:
   a. a vertically disposed tubular housing with an upper liquid admitting portion forming an admitting chamber, the housing having a closed upper end and side passages to admit liquid thereto;
   b. the housing further having a lower closed collection chamber spaced downwardly from said admitting chamber for recovered hydrocarbon liquids;
   c. said housing having a vertically disposed hydrocarbon liquid-water separator within said admitting chamber and leading to said collection chamber and sealing said admitting chamber from said collection chamber;
   d. said separator including a perforate portion with a tubular hydrophobic filter film membrane with microscopic pores of a diameter to pass hydrocarbon liquid by capillary attraction through to said collection housing, while being impervious to the passage of water;
   e. a hydrophobic wick in said admitting chamber wrapping around and in close contact with said filter film membrane to draw the hydrocarbon liquid to said filter membrane;
   f. a selectively opened and closed valve outlet for said collection chamber to permit emptying of the collected hydrocarbon liquid; and
   g. an outlet in the upper end of said separator above said filter membrane and wick for removing air from said collection chamber as the collection chamber fills.

2. The system defined in claim 1 wherein said separator is an elongate tubular cartridge releasably connected to said housing and having a perforate portion provided concentrically within said separator in closed communication with said collection chamber; seal means prevents liquid from entering said collection chamber except through said cartridge; said filter film membrane is a tubular body surrounding the perforate portion of said cartridge, and said wick is a tubular body surrounding said filter membrane in full circumferential contact therewith from one end of the wick to the other.

3. The system defined in claim 2 wherein the upper end of said cartridge is spaced below the upper end of said housing and is open to the passages in the upper end of said housing above said filter membrane and wick.

4. The system defined in claim 3 wherein the side passages in said upper end of the housing comprise elongate axial slots, extending from near the upper end of said housing downwardly, which permit the egress of air from the upper end of said cartridge means as the collection chamber fills.

5. The system defined in claim 1 wherein said wick is a water-shedding polypropylene toweling which absorbs and wicks liquid hydrocarbon fuel.

6. The combination defined in claim 1 wherein said filter membrane is in peripheral contact with said perforate portion of the separator and filter membrane, and enveloping O-ring rubber seals above and below said perforate portion of the separator and said wick seal said filter membrane to said separator.

7. The combination defined in claim 1 wherein said filter membrane comprises a microscopically porous laminate consisting of an interior polytetrofluorethylene membrane with a polypropylene film on each side.

8. The combination defined in claim 7 wherein said filter membrane has a thickness in the range of 25-65 mm.

9. A system defined in claim 1 wherein said separator is al elongate tubular member having a perforate portion provided within said separator in closed communication with said collection chamber; seal means prevents liquid from entering said collection chamber except through said separator; said filter film membrane is a tubular body surrounding the perforate portion of said separator, and said wick is a tubular body surrounding said filter membrane in circumferential contact therewith.

10. A liquid hydrocarbon skimmer system in combination with a ground water well structure containing ground water, which is located adjacent an underground hazardous liquid tank, comprising:
   a. a vertically disposed tubular housing providing a lower collection chamber for recovered hydrocarbon liquid;

b. said housing having a predetermined buoyancy and a hydrocarbon liquid-water separator above said chamber and connected thereto to communicate therewith, floating at a predetermined level in said well;

c. said separator including a filter cartridge with a capillarial filter element of such character as to pass hydrocarbon liquid through to said collection chamber, while being impervious to the passage of water;

d. said separator having an enclosure surrounding said cartridge with openings to admit hydrocarbon liquid;

e. absorbent wick means associated with said filter cartridge in contact with the filter element to draw the hydrocarbon liquid to said filter element;

f. selectively opened and closed outlet passage means associated with said collection chamber to permit emptying of the collected hydrocarbon liquid; and g. a flexible suspension member connectable to the well structure to suspend the separator at a first level wherein the suspension member is partly slacked by the buoyancy of said chamber when the collection chamber is empty and wherein a lowermost position of float of the filter on the surface of the water table is not exceeded as the collection chamber fills.

11. The system of claim 10 wherein a passage is provided in the upper end of the separator above the liquid level in the well and said passage and a portion of said enclosure openings are maintained above the level of the ground water liquid in said well in said lowermost position of float.

12. In a method of operating a floatable liquid hydrocarbon skimmer system in a well containing ground water and liquid hydrocarbon floating thereon, for monitoring possible leaks in hazardous liquid tanks, said system comprising a vertically disposed tubular housing having a closed upper end and side passages to admit liquid, and providing a lower collection chamber spaced downwardly therefrom for recovered hydrocarbon liquid, the housing having a hydrocarbon liquid-water separator within the housing associated with the chamber and connected thereto to communicate therewith, the separator including a cartridge tube with an opening in its upper end having a microscopically porous capillarial filter element below said upper end of the cartridge tube of such a character as to pass hydrocarbon liquid through to the collection chamber while being impervious to the passage of water, absorbent wick means in contact with the filter element to draw the hydrocarbon liquid to the filter element, and valve means connected with the collection chamber to permit emptying of collected hydrocarbon liquid, the steps of:

a. passing water and liquid hydrocarbon having a specific gravity of less than one into the housing through said side passages while the housing is floating with its upper end and the upper end of said cartridge tube above said liquid hydrocarbon and with a portion of said side passages immersed in the liquid and a portion above it;

b. wicking substantially only the hydrocarbon liquid to the filter element;

c. filtering only the hydrocarbon liquid through the filter element to the collection chamber while passing displaced air up said cartridge tube past said filter element to the opening in the upper end of said cartridge tube to pass through the portion of said side passages above the liquid; and d. opening the collection chamber to a storage receptacle.

13. The method of claim 12 wherein the collection chamber is emptied back into said hazardous liquid tank.

14. In a method of operating a liquid hydrocarbon skimmer system floating in a ground water well which is located adjacent an underground hazardous liquid tank, and comprising a vertically disposed tubular housing providing a lower collection chamber for recovered hydrocarbon liquid, the housing having a predetermined buoyancy and a tubular hydrocarbon-liquid water separator above the chamber and connected thereto to communicate therewith, the housing floating at a predetermined level in the well with its upper end and the upper end of the separator projecting above the liquid in the well, the separator including a filter cartridge with a capillarial filter element of such character as to pass hydrocarbon liquid through to the collection housing, while being impervious to the passage of water, and further having an enclosure surrounding the cartridge with openings above the liquid level in the well and below it, an absorbent wick associated with the filter cartridge in contact with the filter element to draw the hydrocarbon liquid to the filter element, a selectively opened and closed valved outlet associated with the collection chamber to permit emptying of the collected hydrocarbon liquid, a passage in the upper end of the separator adjacent the portion of the enclosure openings above the liquid level in the well, and a suspension member connectable to suspend the separator at a first level wherein the suspension member is partly slacked by the buoyancy of the chamber when the collection chamber is empty and wherein a lowermost position of float of the filter on the surface of the water table, which keeps the passage in the upper end of the separator and a portion of the openings in the enclosure above the liquid level in the well, is not exceeded as the collection chamber fills and sinks, the steps of:

a. passing water and liquid hydrocarbon having a specific gravity of less than one into the housing;

b. wicking substantially only the hydrocarbon liquid to the filter element;

c. filtering only the hydrocarbon liquid to the collection chamber;

d. passing air from the collection chamber up through the interior of the separator to the passage in the separator and out the enclosure openings above the level of liquid in the well; and e. removing the skimmer system from the well and emptying the collection chamber to a storage receptacle via opening the valved outlet passage.

15. The method of claim 14 wherein the collection chamber is emptied back into said hazardous liquid tank.

16. A liquid hydrocarbon skimmer system for monitoring possible leaks in hazardous liquid tanks comprising:

a. a vertically disposed tubular housing having an upper end with side passages adapted to be immersed to admit liquid and providing a collection chamber spaced downwardly therefrom for receiving recovered hydrocarbon liquid;

b. said housing containing a hydrocarbon liquid-water separator associated with said chamber and connected thereto to communicate therewith;

c. said separator including a microscopically porous filter film element of such a character as to pass hydrocarbon liquid by capillary attraction through to said collection chamber, while being impervious to the passage of water, the separator sealing the upper end of the housing from the collection chamber;

d. a wick in said housing in contact with said filter element to draw the hydrocarbon liquid to said filter element; and e. valve mechanism communicating with said collection chamber to permit emptying of the collected hydrocarbon liquid.

17. The invention of claim 16 wherein the filter element is a hydrophobic microscopically porous, film membrane with capillarial pores having a thickness in the range of 25 to 65 mm., and the wick comprises a saturatable hydrophobic toweling layer wrapped in contact with said membrane which has a layer thickness in the neighborhood of three sixteenths of an inch.

18. The invention of claim 17 in which said filter element includes a polytetraflouroethane film.

19. The invention of claim 18 in which said film comprises a filter layer and a backer screen layer.

20. The invention of claim 19 in which said backer screen layer is formed of polypropylene, and there is such a backer screen on each side of the polytetraflouroethane film.

21. A floating liquid hydrocarbon skimmer system for monitoring possible leaks in hazardous liquid tanks comprising:

a. a vertically disposed, bouyant, tubular housing with an upper liquid admitting portion forming an admitting chamber;

b. the housing further having a lower closed collection chamber spaced downwardly from said admitting chamber for recovered hydrocarbon liquid;

c. said housing having a vertically disposed hydrocarbon liquid-water separator within said admitting chamber and leading to said collection chamber and sealing said admitting chamber from said collection chamber;

d. said separator including a tubular filter film membrane with microscopic pores of a size to pass hydrocarbon liquid by capillary attraction through to said collection housing, while being impervious to the passage of water at the depth the separator floats;

e. a hydrophobic wick in said admitting chamber wrapped around and in close contact with said filter film membrane to draw the hydrocarbon liquid to said filter film membrane; and f. an outlet for removing air from said collection chamber as the collection chamber fills.

22. In a method of operating a floatable liquid hydrocarbon skimmer system in a well containing ground water and liquid hydrocarbon floating thereon, for monitoring possible leaks in hazardous liquid tanks said system comprising a vertically disposed tubular housing having an upper end with a passage configuration to admit liquid, and providing a lower collection chamber spaced downwardly therefrom for recovered hydrocarbon liquid, the housing having a hydrocarbon liquid-water separator within the housing associated with the chamber and connected thereto to communicate therewith, the separator including a cartridge tube with an opening in its upper end having a microscopically porous capillarial filter element below said upper end of the cartridge tube of such a character as to pass hydrocarbon liquid through to the collection chamber while being impervious to the passage of water at the depth of float of the separator, and an absorbent wick in wetting contact with the filter element to draw the hydrocarbon liquid to the filter element, the steps of:

a. passing water and liquid hydrocarbon having a specific gravity of less than one into the housing through said passage configuration while the housing is floating with its upper end and the upper end of said cartridge tube above said liquid hydrocarbon and with a portion of said passage configuration immersed in the liquid;

b. wicking substantially only the hydrocarbon liquid to the filter element;

c. filtering only the hydrocarbon liquid through the filter element to the collection chamber while passing displaced air up to atmosphere; and d. emptying liquid in the collection chamber to a storage receptacle.

23. A floating liquid hydrocarbon skimmer system for monitoring possible leaks in hazardous liquid tanks comprising:

a. a vertically disposed tubular housing having an upper end with a passage adapted to be immersed to admit liquid and providing a collection chamber spaced downwardly therefrom for receiving recovered hydrocarbon liquid;

b. said housing containing a hydrocarbon liquid-water separator associated with said chamber and connected thereto to communicate therewith;

c. said separator including a hydrophobic wick and a microscopically porous filter film membrane element in wetting facial contact with said wick of such a character as to pass hydrocarbon liquid by capillary attraction through to said collection chamber, while being impervious to the passage of water, the separator sealing the upper end of the housing from the collection chamber; and d a passage system communicating with said collection chamber to permit emptying of the collected hydrocarbon liquid.

* * * * *

UNITED STATES PATENT AND TRADEMARK OFFICE
CERTIFICATE OF CORRECTION

PATENT NO. : 5,284,048
DATED : February 8, 1994
INVENTOR(S) : John A. Horner

It is certified that error appears in the above-indentified patent and that said Letters Patent is hereby corrected as shown below:

Column 3, line 56, change "ca" to -- cap --.

Column 4, line 34, after "pores" insert p; line 37, change "o ar" to -- p are --.

Column 6, line 51, change "A" to --The--; line 52, change "al" to --an--.

Signed and Sealed this

Second Day of August, 1994

Attest:

BRUCE LEHMAN

Attesting Officer   Commissioner of Patents and Trademarks